United States Patent [19]
Milam et al.

[11] 3,879,686
[45] Apr. 22, 1975

[54] LASER SYSTEM FOR PRODUCING VARIABLE DURATION SHORT PULSES

[75] Inventors: David Milam, Lexington; Howard Schlossberg, Burlington, both of Mass.; Abraham Szoke, Kfar Shmaryahu, Israel

[73] Assignee: The United States of America as represented by the Secretary of the United States Air Force, Washington, D.C.

[22] Filed: Sept. 20, 1973

[21] Appl. No.: 399,010

[52] U.S. Cl............................................ 331/94.5 M
[51] Int. Cl............................................. H01s 3/10
[58] Field of Search ............ 331/94.5; 356/106, 111

[56] References Cited
UNITED STATES PATENTS
3,663,890   5/1972   Schulthess et al. ............ 331/94.5 C

*Primary Examiner*—William L. Sikes
*Attorney, Agent, or Firm*—Jacob N. Erlich

[57] ABSTRACT

A laser system for producing intense variable duration short pulses in the range of 0.1 to 3.0 nanoseconds. The laser system utilizes a Michelson interferometer set for maximum reflection at the lasing frequency as one end element. A phase or amplitude switch is placed in the cavity in front of the interferometer in order to change the input to the interferometer resulting in a pulse out of the interferometer whose duration is given by twice the difference in path length of the interferometer arms divided by the speed of light.

6 Claims, 3 Drawing Figures

LASER SYSTEM FOR PRODUCING VARIABLE DURATION SHORT PULSES

BACKGROUND OF THE INVENTION

This invention relates generally to lasers, and, more particularly to a laser system for generating intense variable duration short pulses in the range of 0.1 to 3.0 nanoseconds.

Lasers are now established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said exist.

The active material in the laser is made optically resonant by placing reflectors at either end thereof. Reflectors external to the laser material may be used but in the case of solid materials, such as a ruby rod, each end of the rod may be mirrored. The reflector on at least one end of the material is made partially transmissive so that there will be an escape from the resonant chamber.

Heretofore, by modification of the above mentioned laser it has been possible by a conventional Q-switching technique to produce laser pulses in the range of 10–100 nanoseconds, and with a mode locking technique to generate laser pulses in the area of 1–200 picoseconds. However, to date, it has been impossible to easily generate laser pulses of a length which fall between the above mentioned limits, that is, in the range of 0.1–3 nanoseconds. Pulses produced in the range of 0.1–3 nanoseconds have great application in short pulse propagation and amplification studies, pulsed fluorescence measurements, optical damage studies, radar, holographic analysis of rapidly occurring events and perhaps most importantly laser fusion. It is therefore clearly evident that a great need arises for the economical and reliable production of laser pulses within this range.

SUMMARY OF THE INVENTION

The instant invention sets forth a laser system which is capable of generating high intensity, variable duration short laser pulses and thereby overcomes the problems set forth hereinabove.

The system which makes up this invention utilizes any suitable laser rod, a conventional pumping pulse which may be in the form of a flash of intense light, a fully reflective mirror or other reflective element at one end of the laser rod, a Michelson interferometer at the other end of the laser rod and a switch interposed between the laser rod and the Michelson interferometer in order to alter the input to the interferometer. By precisely adjusting the path length difference between the interferometer arms the laser pulse duration emanating therefrom can range from 0 to a few nanoseconds with the lower limit being set by the time required to terminate the input to the interferometer.

It is therefore an object of this invention to provide a laser system for producing variable duration laser pulses in the range of 0.1–3 nanoseconds.

It is a further object of this invention to provide a laser system for producing short laser pulses, the duration of which may be precisely controlled.

It is another object of this invention to provide a laser system for producing variable duration short laser pulses which is highly reliable in operation, economical to produce, and which utilizes conventional, currently available components that lend themselves to standard mass producing manufacturing techniques.

For a better understanding of the present invention, together with other and further objects thereof reference is made to the following description taken in connection with the accompanying drawings and its scope will be pointed out in the appended claims.

DETAILED DESCRIPTION OF THE PREFERRED EMBODIMENT

Figure 1:
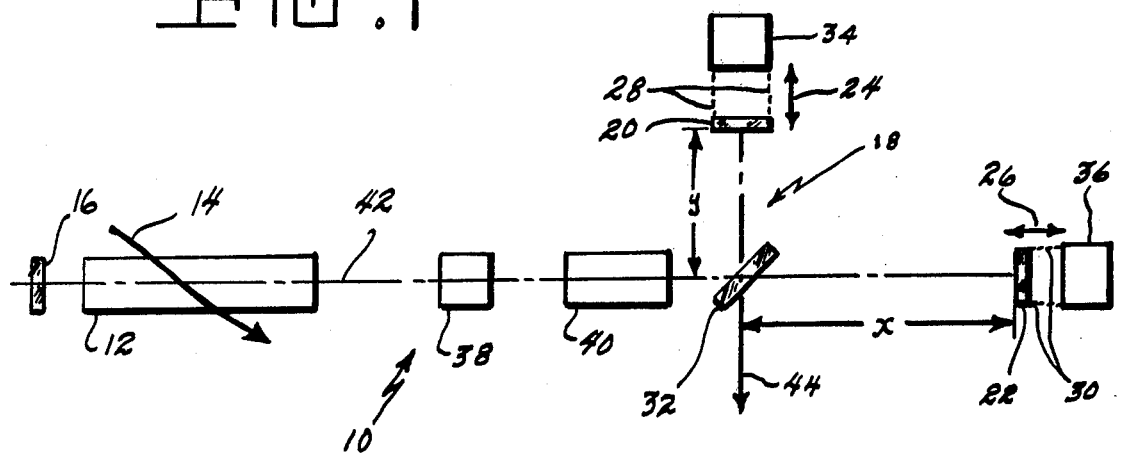
FIG. 1 is a schematic diagram of the short-pulse laser system of this invention.

Reference is now made to FIG. 1 of the drawing which best illustrates the laser system 10 of this invention for producing variable duration short laser pulses. System 10 of this invention utilizes a conventional laser source 12 such as a ruby laser in conjunction with any suitable pumping pulse 14 which may be in the form of a flash of intense light. At one end of the laser system 10 in nominal optical alignment with laser source 12 is located any conventional totally reflective surface such as mirror 16, while at the other end thereof in optical alignment with mirror 16 is located a Michelson interferometer 18.

Interferometer 18 is made up of two 100% reflective mirrors 20 and 22, each mounted for slideable movement in the direction of arrows 24 and 26, respectively, on any suitable support such as rails 28 and 30 respectively. A beam splitter 32 is interposed between mirrors 20 and 22. Any suitable drive means such as motors 34 and 36 are interconnected in any conventional, electrical or mechanical manner to mirrors 20 and 22, respectively, for the purpose of positioning each mirror 20 and 22 a predetermined distance Y and X from beam splitter 32 in a manner to be described in detail hereinbelow. Mirrors 20 and 22 are so positioned that the intersection of a pair of lines drawn from mirrors 20 and 22 to the center of beam splitter 32 is at an angle of 90°.

Referring again to FIG. 1, located between laser source 12 and interferometer 18 is a conventional Q-switch 38 in nominal optical alignment with laser source 12 and any suitable switch 40 capable of altering the input 42 ($E_i$) to interferometer 18. Switch 40 is also in nominal optical alignment with laser source 12 as well as interferometer 18. Switch 40 may be in the form of a conventional phase or amplitude switch such as Pockels Cell. It should be noted that Q-switch 38 although a desirable feature utilized with the instant invention may be omitted from system 10 without drastically altering the operation of this invention.

Figure 2:
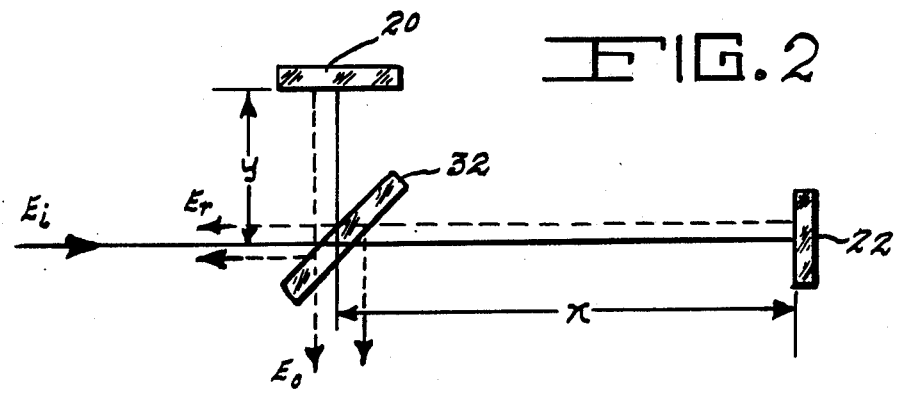
FIG. 2 is an enlarged schematic diagram of the Michelson interferometer utilized in the short-pulse laser system of this invention.

Reference is now made to FIGS. 1 and 2 of the drawing which show the laser system 10 of this invention operated in the normal Q-switched mode. When the laser intensity inside the laser cavity has increased to the desired level (limited only by component damage), the amplitude or phase switch 40 is triggered, producing a pulse ($E_o$) of pre-set duration in the output arm 44 of interferometer 18.

To understand how such an output pulse is produced and how the system 10 of this invention functions, one must first consider Michelson interferometer 18 illuminated by a *cw* (continuous wave) input field $E_i$ as shown in FIG. 2.

Interferometer 18 consists of two 100 % reflective mirrors 20 and 22 and a beam splitter 32 with properties described by R and T. Here $R^2$ and $T^2$ are the reflection and transmission coefficient of the interferometer beam splitter 32 and satisfy the relationship $R^2+T^2 = 1$. With a *cw* plane wave input, $E_i = Ae^{i\omega t}$, where $A$ is the amplitude of the input wave, $\omega$ is the input laser frequency and $t$ represents time, return and output fields are generated which may be described by, $$E_{return} = E_r = A(R^2 e^{i\omega t} + T^2 e^{i\omega(t-t')}),$$

$$E_{output} = E_o = RTA(e^{i\omega t} - e^{i\omega(t-t')}),$$

respectively. In this case $t' = [2(x-y)/c]$ is the difference in the round-trip propagation times in the two arms of interferometer 18, $x$ and $y$ represent the lengths of the interferometer arms and $c$ is the speed of light.

If the difference in the lengths of the interferometer arms is adjusted such that $$\omega t' = \frac{2\omega(x-y)}{c} = 2m\pi, m \text{ being an integer then}$$

$$E_o = 0$$

$$E_r = A(R^2+T^2)e^{i\omega t} = E_i,$$

and all radiation entering interferometer 18 is reflected back along the input as shown in the dotted lines in FIG. 2.

Let us assume that the condition $\omega t' = 2m\pi$ has been met, so that there is no output $E_o$ from output arm 44 of interferometer 18. If the input field $E_i$ is suddenly terminated at beam splitter 32 at time $t''$, then after a time $(2y/c)$ all radiation will have drained from the shorter interferometer arm $y$, and the output and return fields are described by $$E_o = RTAe^{i\omega t}; \text{ and}$$

$$E_r = AR^2 e^{i\omega t}.$$

This condition persists until all radiation has drained from the longer arm $x$, so that by simply terminating the field entering interferometer 18 a pulse of duration $t' = [2(x-y)/c]$ is produced.

Figure 3:
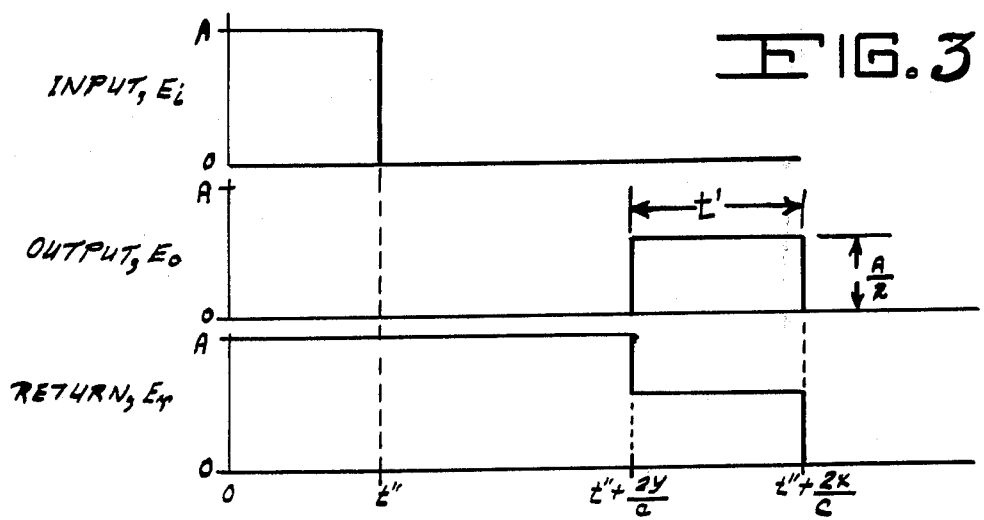
FIG. 3 represents in graphic fashion the input, output and return pulses, respectively, of the laser system of this invention.

This sequence of events is depicted in FIG. 3, for the case $R^2=T^2=0.5$, for example. For the conditions shown in FIG. 3 it is assumed that the input $E_i$ has existed for a time sufficient to establish $E_r$ before switching at $t''$ occurs.

The output pulse $E_o$ duration may be precisely set by adjusting the path length difference in the arms by actuating motors 34 and 36 and can range from 0 to a few nanoseconds with the lower limit being set by the time required to terminate the input field $E_i$. Termination times of $1-2 \times 10^{-10}$sec can be achieved with existing devices so that subnanosecond pulses are possible with the instant invention.

As shown in FIG. 3, if a 180° phase shift by phase switch 40 is impressed on the input at beam splitter 32 at a time $t''$, then after a time $(2y/c)$, the output field becomes, $$E_o = RTA(e^{i\omega t + \pi} - e^{i\omega t}) = -Ae^{i\omega t},$$

if the output had been previously nulled and if $RT=0.5$. In this mode, variable-duration pulses of intensity equal to the input intensity can be obtained.

In addition with the phase "shift" mode of operation of this invention, multiple pulses are possible by simply generating phase shifts larger than 180°. The null in interferometer 18 will be spoiled, and a pulse produced, as the phase is shifted sequentially through the values, $$0 = (2m+i)\pi, m = 0, 1, \text{---Integer}.$$

The pulse generated in the "phase-shifter" mode is produced at the cost of leaving a "hole" in the radiation filling the laser cavity. This hole will circulate through the cavity and return to interferometer 18 where it will cause two additional pulses to be emitted from interferometer 18, one due to the leading edge of the hole, and one due to the trailing edge. These multiple pulses not only have fixed durations, but the interval between pulses is adjustable depending on the cavity length.

Although this invention has been described with reference to a particular embodiment, it will be understood to those skilled in the art that this invention is also capable of other embodiments within the spirit and scope of the appended claims.

We claim:

1. A laser system for producing intense variable duration short pulses comprising a lser source, a substantially totally reflective surface located adjacent one end of said laser source and in nominal optical alignment therewith, a Michelson interferometer located adjacent the other end of said laser source and in optical alignment with said mirror and means in nominal optical alignment with an interposed between said laser source and said interferometer for altering the input from said laser source to said interferometer so that the output from said interferometer is in the form of a short laser pulse.

2. A laser system for producing intense variable duration short pulses as defined in claim 1 wherein said Michelson interferometer comprises a beam splitter, a first reflective surface located a predetermined distance from said beam splitter and in optical alignment therewith, means connected to said first reflective surface for moving said first reflective surface to said predetermined distance from said beam splitter, a second reflective surface located a predetermined distance from said beam splitter and in optical alignment therewith and means connected to said second reflective surface for moving said second reflective surface to said predetermined distance from said beam splitter whereby said short output pulse is of a duration $2(x-y)$ where $(x-y)$ is the difference between said predetermined distances and $c$ is the speed of light.

3. A laser system for producing intense variable duration short pulses as defined in claim 2 wherein said input altering means is in the form of a phase switch.

4. A laser system for producing intense variable duration short pulses as defined in claim 2 wherein said input altering means is in the form of an amplitude switch.

5. A laser system for producing intense variable duration short pulses as defined in claim 2 further comprising a Q-switch in nominal optical alignment with an interposed between said laser source and said input altering means. pg,11

6. A laser system for producing intense variable duration short pulses consisting essentially of a laser source, a substantially totally reflective surface located adjacent one end of said laser source and in nominal optical alignment therewith, a Michelson interferometer located adjacent the other end of said laser source and in optical alignment with said mirror and means in nominal optical alignment with and interposed between said laser source and said interferometer for altering the input from said laser source to said interferometer so that the output from said interferometer is in the form of a short laser pulse.

* * * * *

UNITED STATES PATENT OFFICE
CERTIFICATE OF CORRECTION

PATENT NO. : 3,879,686
DATED : 22 April 1975
INVENTOR(S) : David Milam, Howard Schlossberg and Abraham Szoke It is certified that error appears in the above-identified patent and that said Letters Patent are hereby corrected as shown below:

Column 4, line 2, "$E_r=AR^2 e^{i\omega t}$ (" should read

---$E_r=AR^2 e^{i\omega t}$.---

Column 4, line 33, "$0=(2m+i)\pi$ , m=0,1,---Integer"

should read --- $\emptyset = (2m + 1)\pi$, m=0,1, ---Integer---

Column 5, line 11, "2(x-y)" should read ---$\frac{2(x-y)}{c}$---

Column 5, line 6, "pg, 11" should be omitted.

Signed and Sealed this fifth Day of August 1975

[SEAL]

Attest:

RUTH C. MASON
Attesting Officer

C. MARSHALL DANN
Commissioner of Patents and Trademarks